(12) United States Patent
Imamura et al.

(10) Patent No.: US 12,459,596 B2
(45) Date of Patent: Nov. 4, 2025

(54) STRADDLED VEHICLE

(71) Applicant: YAMAHA HATSUDOKI KABUSHIKI KAISHA, Iwata (JP)

(72) Inventors: Mitsutoshi Imamura, Shizuoka (JP); Tadasu Nishikura, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 8 days.

(21) Appl. No.: 17/541,882

(22) Filed: Dec. 3, 2021

(65) Prior Publication Data

US 2022/0204114 A1   Jun. 30, 2022

(30) Foreign Application Priority Data

Dec. 29, 2020   (JP) .................................. 2020-219790

(51) Int. Cl.
*B62K 11/04* (2006.01)
(52) U.S. Cl.
CPC .................................... *B62K 11/04* (2013.01)
(58) Field of Classification Search
CPC ............................. B62K 11/04; B62K 19/12
USPC ............................................ 180/219; 248/73
See application file for complete search history.

(56) References Cited

U.S. PATENT DOCUMENTS

| | | | | |
|---|---|---|---|---|
| 5,480,001 A | * | 1/1996 | Hara | B62K 11/04 180/311 |
| 2006/0283649 A1 | * | 12/2006 | Nakanishi | B62K 25/283 180/227 |
| 2009/0166119 A1 | * | 7/2009 | Susaki | B62K 11/04 180/219 |
| 2014/0091539 A1 | * | 4/2014 | Tominaga | B60G 17/08 188/322.13 |

FOREIGN PATENT DOCUMENTS

| | | | | |
|---|---|---|---|---|
| EP | 3281849 A1 | * | 2/2018 | ............... B62H 1/02 |
| JP | 6605324 B2 | | 11/2019 | |
| WO | WO-2018216635 A1 | * | 11/2018 | ............. B62K 19/16 |

* cited by examiner

*Primary Examiner* — Lindsay M Low
*Assistant Examiner* — Omar Morales
(74) *Attorney, Agent, or Firm* — Rabin & Berdo, P.C.

(57) ABSTRACT

A straddled vehicle including a rear wheel, a first rear arm rotatably supporting the rear wheel, a vehicle body frame and a first reinforcing component. The vehicle body frame includes a head pipe, a main frame connected to the head pipe, a pivot support portion connected to the main frame, the pivot support portion including a pivot shaft swingably supporting the first rear arm and a pivot support frame supporting the pivot shaft, and a first rear frame extending rearward from the main frame, the first rear frame being connected to the main frame on a more inner side than the first rear arm in a right-and-left direction of the straddled vehicle. The first reinforcing component is separated from the first rear frame, the first reinforcing component being disposed outside the first rear arm in the right-and-left direction, and being connected to the pivot support portion and the first rear frame.

15 Claims, 12 Drawing Sheets

STRADDLED VEHICLE

CROSS-REFERENCE TO RELATED APPLICATIONS

This application is based on, and claims priority from, Japanese Patent Application No. 2020-219790, filed on Dec. 29, 2020. The contents of the application is incorporated herein by reference.

BACKGROUND

Field of the Invention

The present invention relates to a straddled vehicle.

Background Information

A straddled vehicle includes a main frame, a rear frame, a pivot support portion, and a rear arm. The pivot support portion is connected to the main frame. The pivot support portion includes a pivot shaft. The rear arm is supported by the main frame so as to be swingable about the pivot shaft. The rear arm rotatably supports a rear wheel. The rear frame is connected to the main frame and extends therefrom rearward. For example, Publication of Japan Patent No. 6605324 describes a straddled vehicle in which a rear frame is disposed inside a rear arm in a vehicle right-and-left direction.

SUMMARY

In development of straddled vehicles, it is preferable to make a vehicle body frame compatible among a plurality of straddled vehicle models in terms of reduction in developmental cost. However, a stiffness required for the vehicle body frame depends on the straddled vehicle models. For example, there is a large difference in required stiffness between a straddled vehicle model for town use and that for racing use. When a vehicle body frame with high stiffness is used for a straddled vehicle model not requiring high stiffness, the straddled vehicle model is undesirably increased in weight or vehicle width. Contrarily, when a vehicle body frame with low stiffness is used for a straddled vehicle model requiring high stiffness, the straddled vehicle model undesirably lacks stiffness. Because of this, it is difficult to make a vehicle body frame compatible among the plural straddled vehicle models.

It is an object of the present invention to meet a stiffness required for a straddled vehicle and simultaneously make a vehicle body frame compatible among a plurality of straddled vehicle models.

A straddled vehicle according to an aspect of the present invention includes a rear wheel, a first rear arm, a vehicle body frame, and a first reinforcing component. The first rear arm rotatably supports the rear wheel. The vehicle body frame includes a head pipe, a main frame, a pivot support portion, and a first rear frame. The main frame is connected to the head pipe. The pivot support portion is connected to the main frame and includes a pivot shaft and a pivot support frame. The pivot shaft swingably supports the first rear arm. The pivot support frame supports the pivot shaft. The first rear frame extends rearward from the main frame and is connected to the main frame on a more inner side than the first rear arm in a vehicle right-and-left direction. The first reinforcing component is provided as a discrete component separated from the first rear frame. The first reinforcing component is disposed outside the first rear arm in the vehicle right-and-left direction. The first reinforcing component is connected to the pivot support portion and the first rear frame.

In the straddled vehicle according to the present aspect, the first reinforcing component passes through the outer side of the first rear arm and is connected to the pivot support portion and the first rear frame. Accordingly, the vehicle body frame is enhanced in stiffness. Besides, by either adjusting the stiffness of the first reinforcing component or omitting installation of the first reinforcing component in a manufacturing process, the vehicle body frame is made compatible as well to a straddled vehicle model not requiring large stiffness. Accordingly, the same type of frame is made easily compatible among a plurality of straddled vehicle models. Furthermore, the first reinforcing component is disposed on an outer side of the first rear arm. Hence, the first reinforcing component can be more easily changed in shape than the first rear frame located on a more inner side than the first rear arm. Because of this, the vehicle body frame can be efficiently adjusted in stiffness.

The first reinforcing component may overlap the first rear arm in a vehicle side view. In this case, the vehicle body frame is enhanced in stiffness by the first reinforcing component.

The rear wheel may include a sprocket. The straddled vehicle may further include a chain wound about the sprocket. The first reinforcing component may be disposed outside the chain in the vehicle right-and-left direction. In this case, the vehicle body frame is enhanced in stiffness by the first reinforcing component. Besides, the first reinforcing component is easily adjusted in stiffness.

The first reinforcing component may overlap the pivot support portion and the first rear frame in a vehicle side view. In this case, the pivot support portion and the first rear frame are protected by the first reinforcing component.

The first reinforcing component may include a first lower reinforcing member and a first upper reinforcing member. The first lower reinforcing member may be connected to the pivot support portion. The first upper reinforcing member may be provided as a discrete member separated from the first lower reinforcing member. The first upper reinforcing member may be connected to the first rear frame. In this case, the first reinforcing component is divided into a plurality of members, whereby formation of the first reinforcing component is made easy.

The first upper reinforcing member may be attached to the first lower reinforcing member in detachable manner. The first upper reinforcing member may be attached to the first rear frame in detachable manner. In this case, access to a component disposed on the inner side of the first reinforcing component is made easy by detaching the first upper reinforcing member from the vehicle body frame.

The straddled vehicle may further include a bolt. The bolt may fix the first lower reinforcing member and the pivot shaft together to the pivot support frame. In this case, attaching the pivot shaft is made easy without being interfered by the first lower reinforcing member.

The first upper reinforcing member may be shaped to bulge outward in the vehicle right-and-left direction. In this case, the first upper reinforcing member is enhanced in stiffness.

The first upper reinforcing member may include a reinforcing rib provided on an inner surface thereof. In this case, the first upper reinforcing member is enhanced in stiffness.

The straddled vehicle may further include a second rear arm and a second reinforcing member. The second rear arm may be disposed away from the first rear arm in the vehicle right-and-left direction. The second rear arm may rotatably support the rear wheel. The vehicle body frame may further include a second rear frame. The second rear frame may extend rearward from the main frame. The second rear frame may be disposed away from the first rear frame in the vehicle right-and-left direction. The second rear frame may be connected to the main frame on a more inner side than the second rear arm in the vehicle right-and-left direction. The second reinforcing component may be provided as a discrete member separated from the second rear frame. The second reinforcing component may be disposed outside the second rear arm in the vehicle right-and-left direction. The second reinforcing component may be connected to the pivot support portion and the second rear frame. In this case, the vehicle body frame is enhanced in stiffness by the second reinforcing component. Besides, by omitting installation of the second reinforcing component in a manufacturing process, the vehicle body frame is made compatible as well to a straddled vehicle model not requiring large stiffness. Accordingly, the same type of frame is made easily compatible among a plurality of straddled vehicle models.

The straddled vehicle may further include a cross member connected to the first reinforcing component and the second reinforcing component. In this case, the vehicle body frame is further enhanced in stiffness.

The cross member may be connected to the pivot support frame. In this case, the vehicle body frame is further enhanced in stiffness.

The second reinforcing component may include a second lower reinforcing member and a second upper reinforcing member. The second lower reinforcing member may be connected to the pivot support portion. The second upper reinforcing member may be provided as a discrete member separated from the second lower reinforcing member. The second upper reinforcing member may be connected to the second rear frame. In this case, the second reinforcing component is divided into a plurality of members, whereby formation of the second reinforcing component is made easy.

The second upper reinforcing member may be connected to the second lower reinforcing member in detachable manner. The second upper reinforcing member may be connected to the second rear frame in detachable manner. In this case, access to a component disposed on the inner side of the second reinforcing component is made easy by detaching the second upper reinforcing member from the vehicle body frame.

The straddled vehicle may further include a rear brake and a brake hose. The rear brake may be configured to brake the rear wheel. The brake hose may be connected to the rear brake. The brake hose may be disposed along the second rear arm. The brake hose may be disposed inside the second upper reinforcing member in the vehicle right-and-left direction. In this case, access to the brake hose is made easy by detaching the second upper reinforcing member from the vehicle body frame.

DETAILED DESCRIPTION OF EMBODIMENTS

Figure 1:
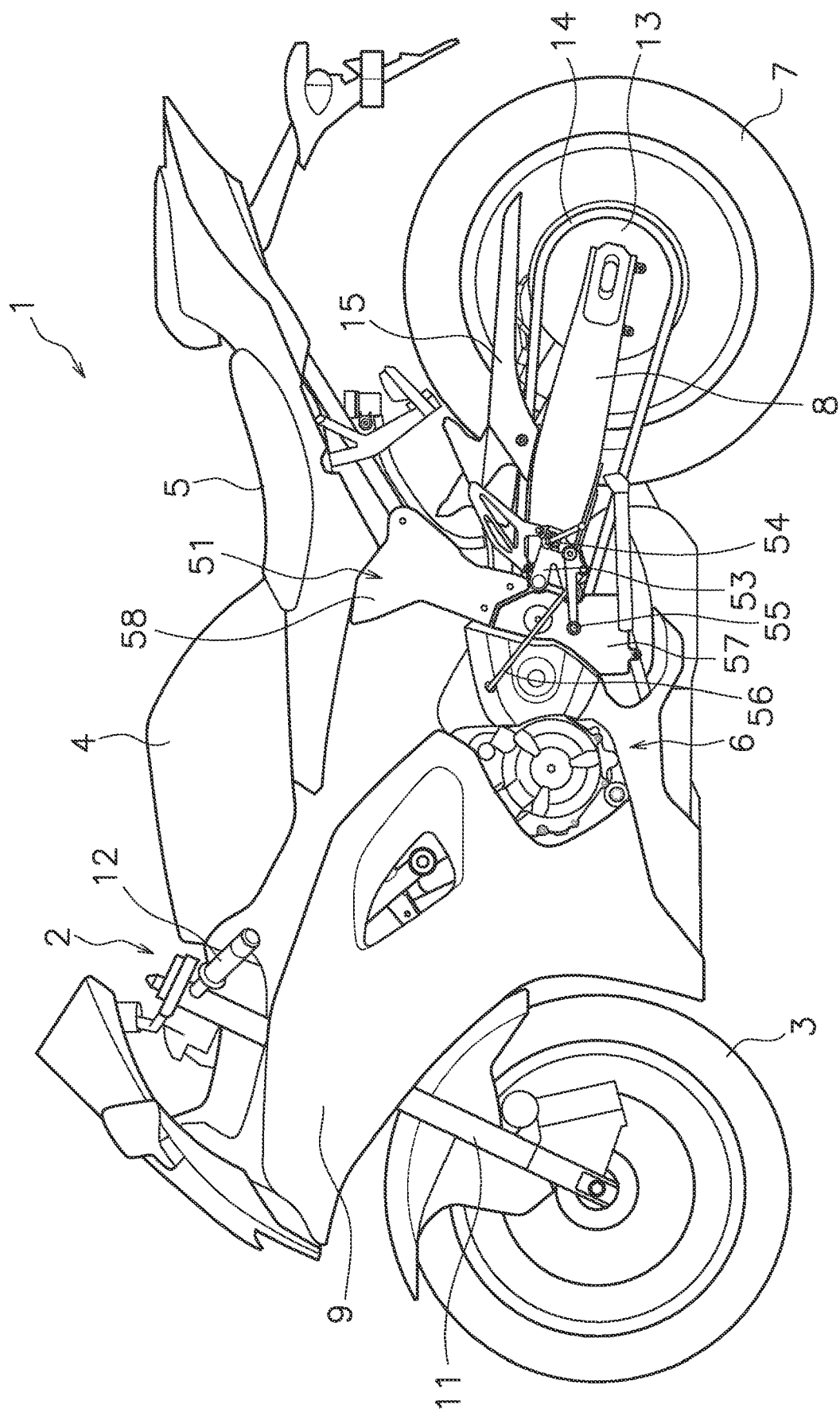
FIG. 1 is a side view of a straddled vehicle according to an embodiment.

A straddled vehicle according to an embodiment will be hereinafter explained with reference to drawings. FIG. 1 is a side view of a straddled vehicle 1 according to the preferred embodiment. As shown in FIG. 1, the straddled vehicle 1 includes a steering device 2, a front wheel 3, a fuel tank 4, a seat 5, a power unit 6, a rear wheel 7, a rear arm 8, and a vehicle body cover 9. Besides, the straddled vehicle 1 includes a vehicle body frame 10 shown in FIG. 2. It should be noted that in the present embodiment, the terms "front", "rear", "right", and "left" are defined as meaning front, rear, right, and left directions seen from a rider seated on the seat 5.

The steering device 2 is steered by the rider. The steering device 2 includes a front fork 11 and a handle member 12. The front fork 11 supports the front wheel 3 such that the front wheel 3 is made rotatable. The handle member 12 is connected to the front fork 11. The fuel tank 4 is disposed behind the handle member 12. The seat 5 is disposed behind the fuel tank 4. The power unit 6 is disposed between the front wheel 3 and the rear wheel 7. The power unit 6 generates a drive force for rotating the rear wheel 7. The power unit 6 includes, for instance, an internal combustion engine and a transmission. It should be noted that the power unit 6 may include an electric motor.

The rear wheel 7 is disposed behind the power unit 6. The rear wheel 7 is rotatably supported by the rear arm 8. The rear wheel 7 includes a sprocket 13. A chain 14 is wound about the sprocket 13. The chain 14 is wound about an output shaft (not shown in the drawings) of the power unit 6. A chain guard 15 is disposed above the chain 14. The chain guard 15 is connected to the rear arm 8. The vehicle body cover 9 covers the vehicle body frame 10.

Figure 2:
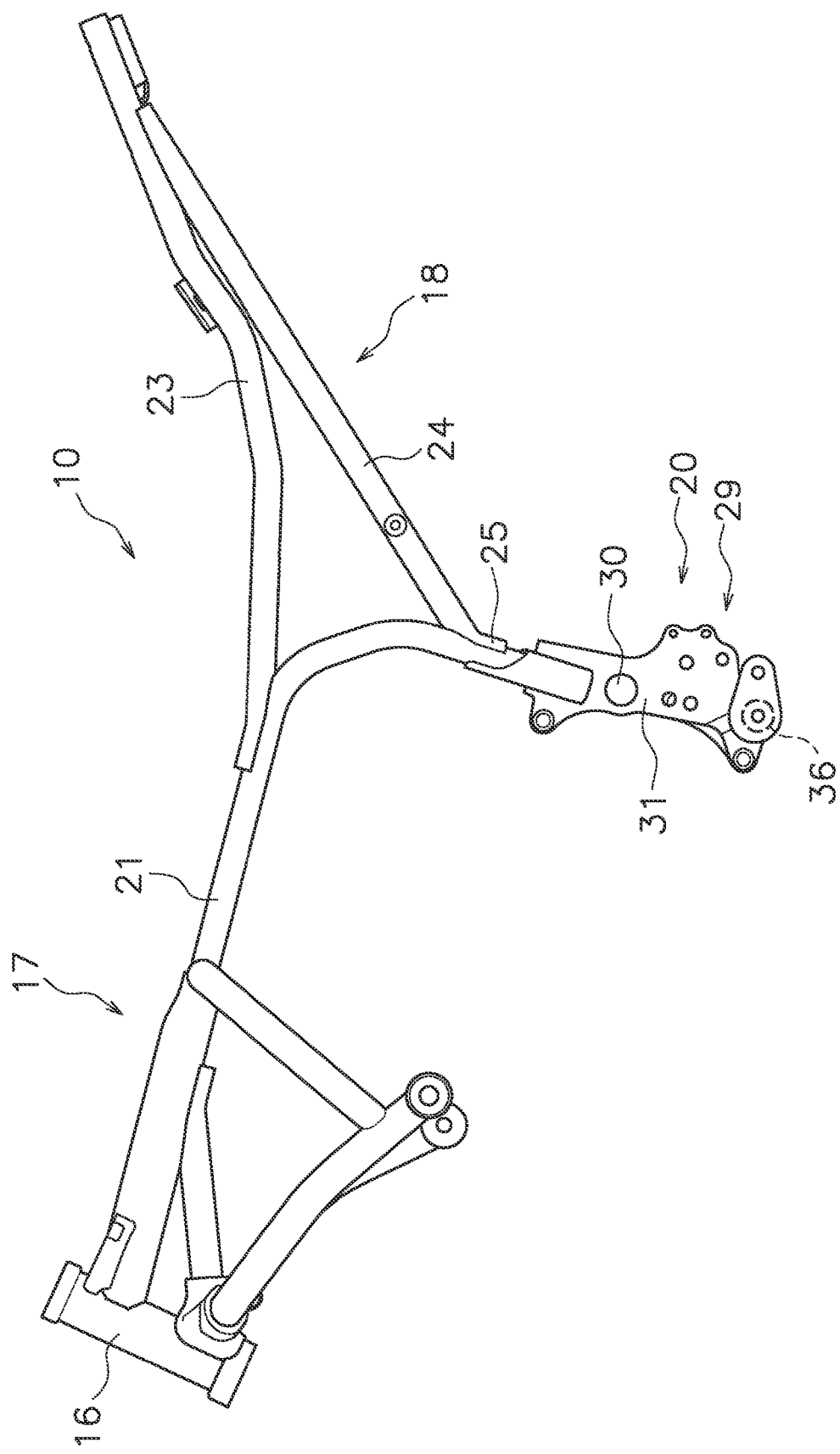
FIG. 2 is a side view of a vehicle body frame.
Figure 3:
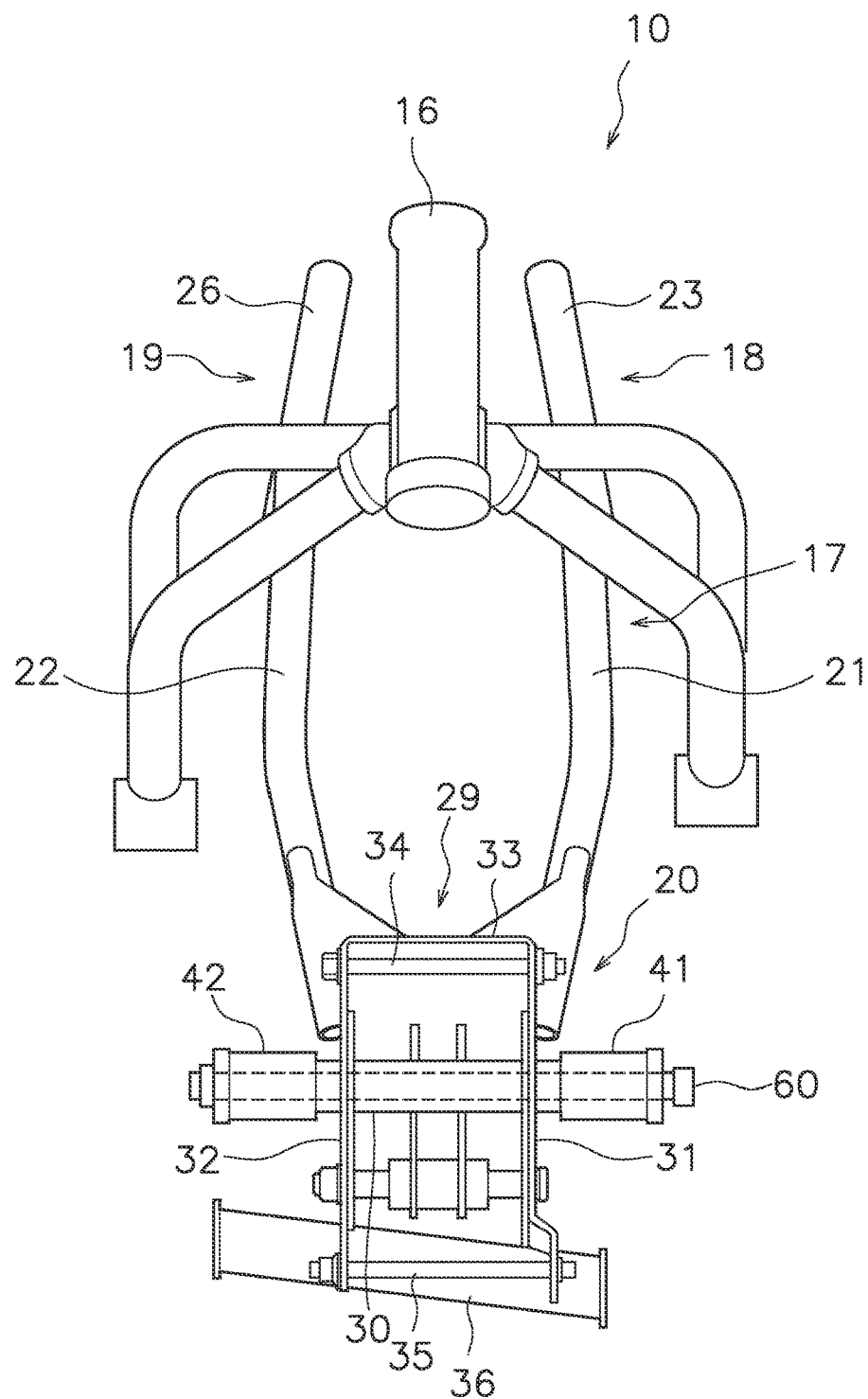
FIG. 3 is a front view of the vehicle body frame.
Figure 4:
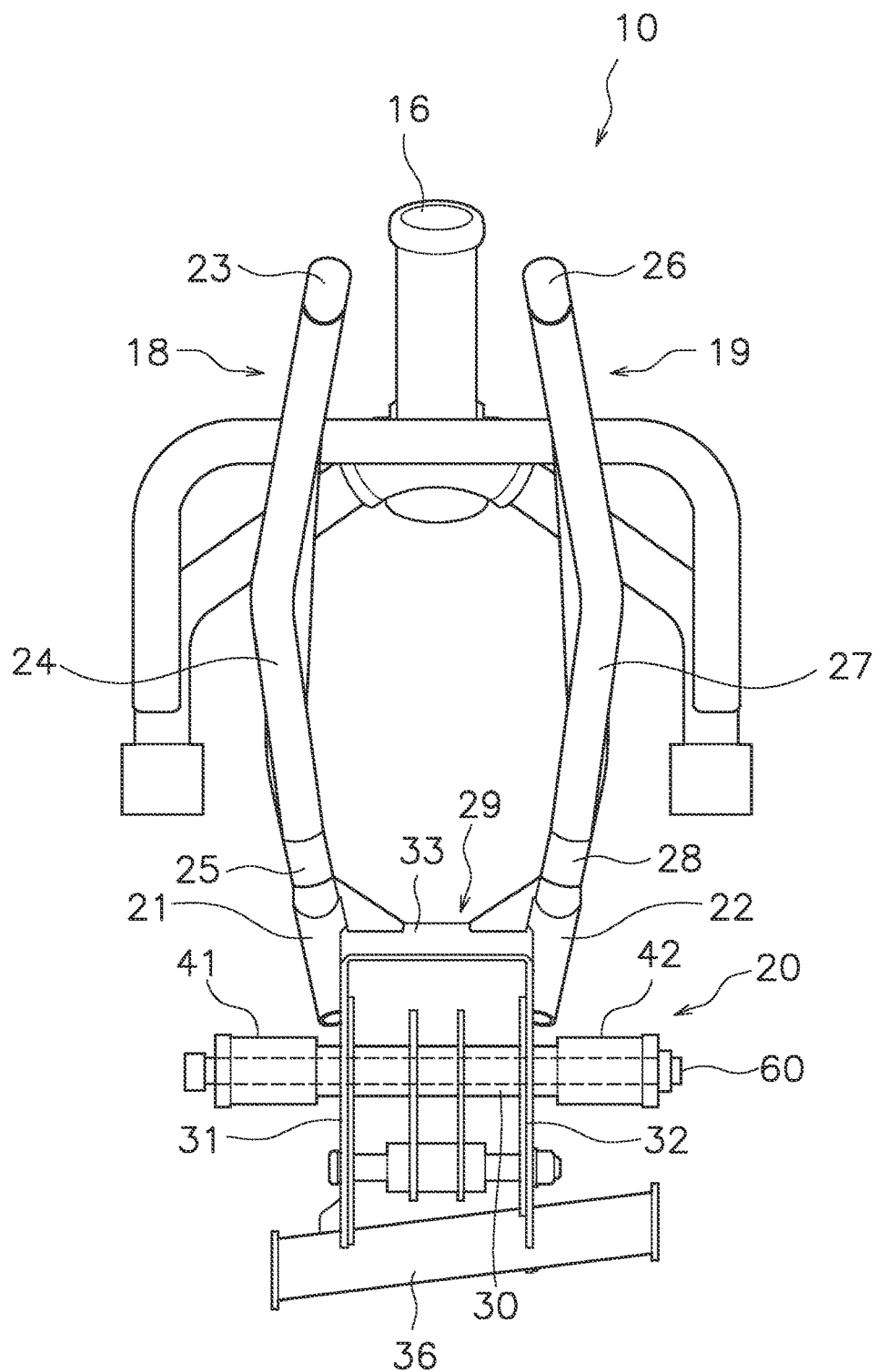
FIG. 4 is a rear view of the vehicle body frame.

FIG. 3 is a front view of the vehicle body frame 10. FIG. 4 is a rear view of the vehicle body frame 10. As shown in FIGS. 2 to 4, the vehicle body frame 10 includes a head pipe 16, a main frame 17, a first rear frame 18, a second rear frame 19, and a pivot support portion 20. The head pipe 16, the main frame 17, the first rear frame 18, and the second rear frame 19 are each made in shape of a pipe. It should be noted that the head pipe 16, the main frame 17, the first rear frame 18, and the second rear frame 19 may be, in portion, made in shape of a plate.

The head pipe 16 slants down forward. The head pipe 16 supports the steering device 2 described above such that the steering device 2 is made turnable right and left. The main frame 17 is connected to the head pipe 16. The main frame 17 extends rearward from the head pipe 16. As shown in FIG. 3, the main frame 17 includes a first main frame 21 and a second main frame 22. The first and second main frames 21 and 22 are disposed right and left away from each other. As shown in FIG. 2, the first main frame 21 is shaped to bend downward. The second main frame 22 is shaped in similar manner to the first main frame 21.

The first and second rear frames 18 and 19 are disposed away from each other in a right-and-left direction. The first and second rear frames 18 and 19 extend rearward from the main frame 17. The first and second rear frames 18 and 19 are disposed below the seat 5. The first rear frame 18 includes a first upper frame 23 and a first lower frame 24. The first lower frame 24 is disposed below the first upper frame 23. The first upper frame 23 and the first lower frame 24 are each connected to the main frame 17. The first lower frame 24 includes a first connecting portion 25. The first lower frame 24 is connected at the first connecting portion 25 to the first main frame 21.

As shown in FIG. 4, the second rear frame 19 includes a second upper frame 26 and a second lower frame 27. The second lower frame 27 is disposed below the second upper frame 26. The second upper frame 26 and the second lower frame 27 are each connected to the main frame 17. The second lower frame 27 includes a second connecting portion 28. The second lower frame 27 is connected at the second connecting portion 28 to the second main frame 22.

The pivot support portion 20 is connected to the main frame 17. The pivot support portion 20 is connected to the lower end of the main frame 17. The pivot support portion 20 supports a pivot support frame 29 and a pivot shaft 30. The pivot support frame 29 supports the pivot shaft 30. The pivot support frame 29 includes a first plate portion 31, a second plate portion 32, and a coupling portion 33. The first and second plate portions 31 and 32 are disposed away from each other in the right-and-left direction. The first plate portion 31 is connected to the lower end of the first main frame 21. The second plate portion 32 is connected to the lower end of the second main frame 22. The coupling portion 33 extends in the right-and-left direction and couples the first and second plate portions 31 and 32 to each other therethrough.

The pivot shaft 30 extends in the right-and-left direction. The pivot shaft 30 is connected to the first and second plate portions 31 and 32. The pivot shaft 30 protrudes outward from the first plate portion 31 in the right-and-left direction. The pivot shaft 30 protrudes outward from the second plate portion 32 in the right-and-left direction. The pivot shaft 30 supports the rear arm 8 such that the rear arm 8 is made swingable. The pivot support portion 20 includes a first coupling shaft 34 and a second coupling shaft 35. The first and second coupling shafts 34 and 35 each extend in the right-and-left direction. The first and second coupling shafts 34 and 35 are each connected to the first and second plate portions 31 and the second plate portion 32.

The vehicle body frame 10 further includes a cross member 36. The cross member 36 is connected to a lower portion of the pivot support frame 29. The cross member 36 is connected to the first and second plate portions 31 and 32. The cross member 36 is disposed on a lower side than the pivot shaft 30. The cross member 36 protrudes outward from the first plate portion 31 in the right-and-left direction. The cross member 36 protrudes outward from the second plate portion 32 in the right-and-left direction.

Figure 5:
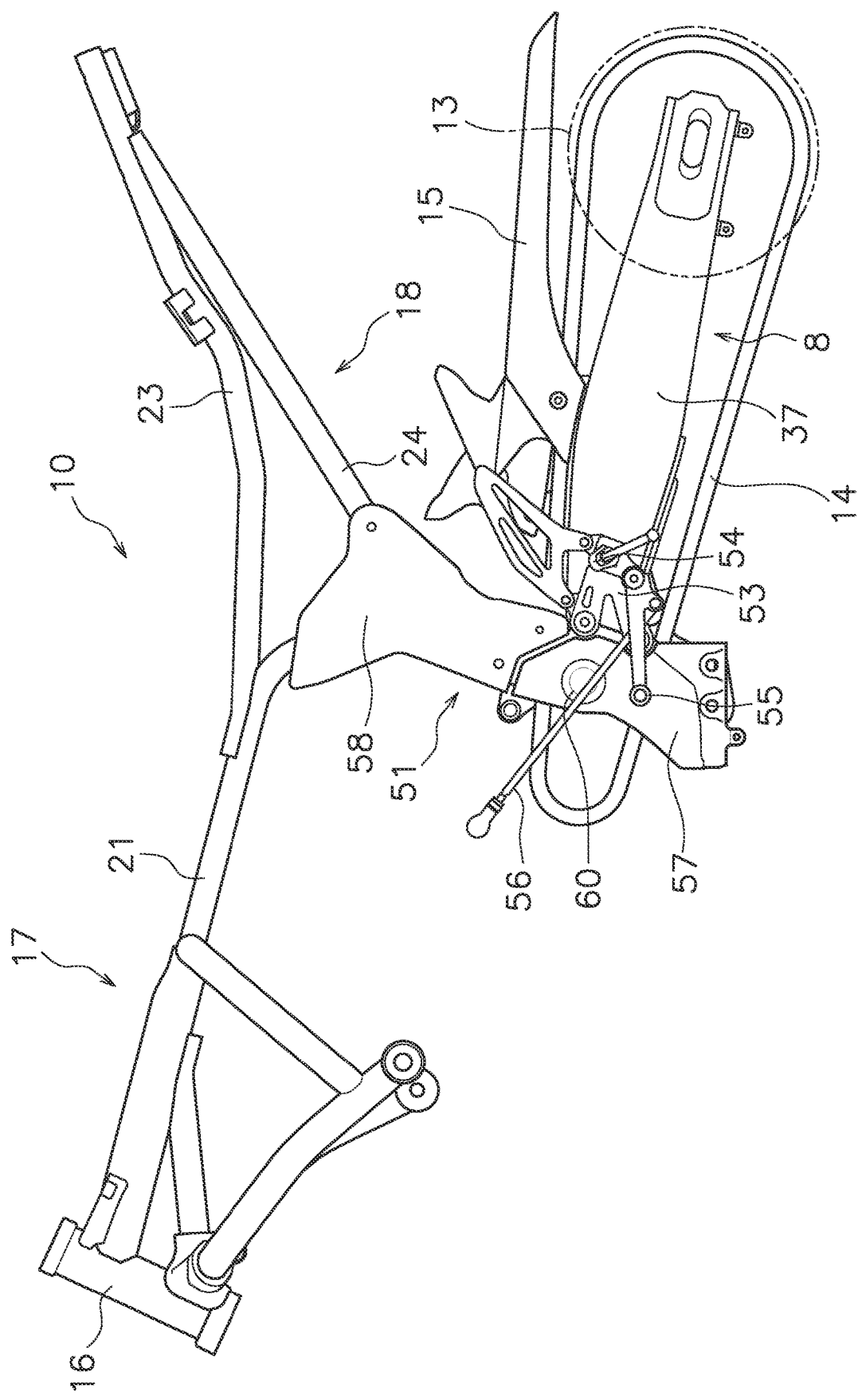
FIG. 5 is a left side view of the vehicle body frame and a configuration of a rear portion of the straddled vehicle.
Figure 6:
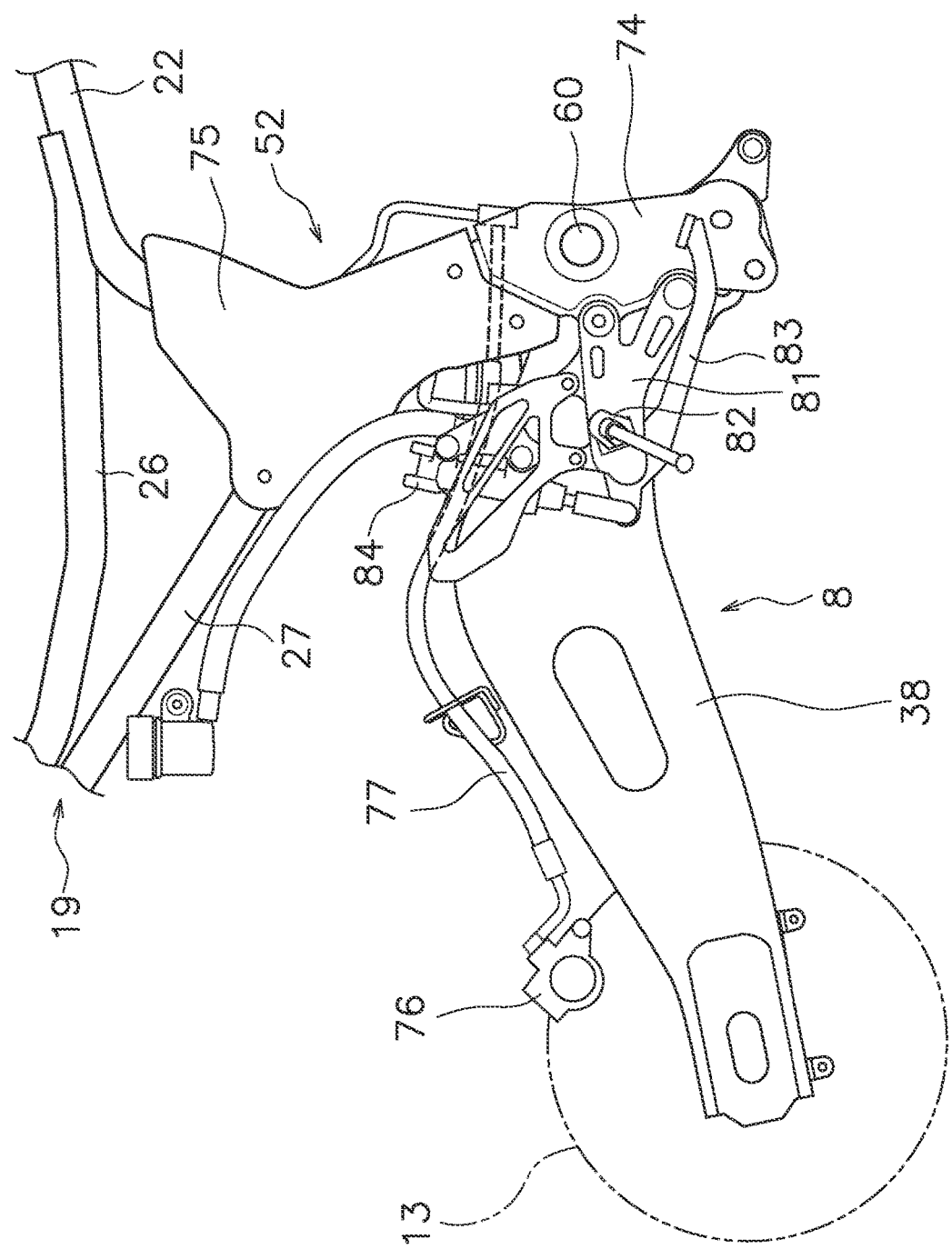
FIG. 6 is a right side view of the vehicle body frame and the configuration of the rear portion of the straddled vehicle.
Figure 7:
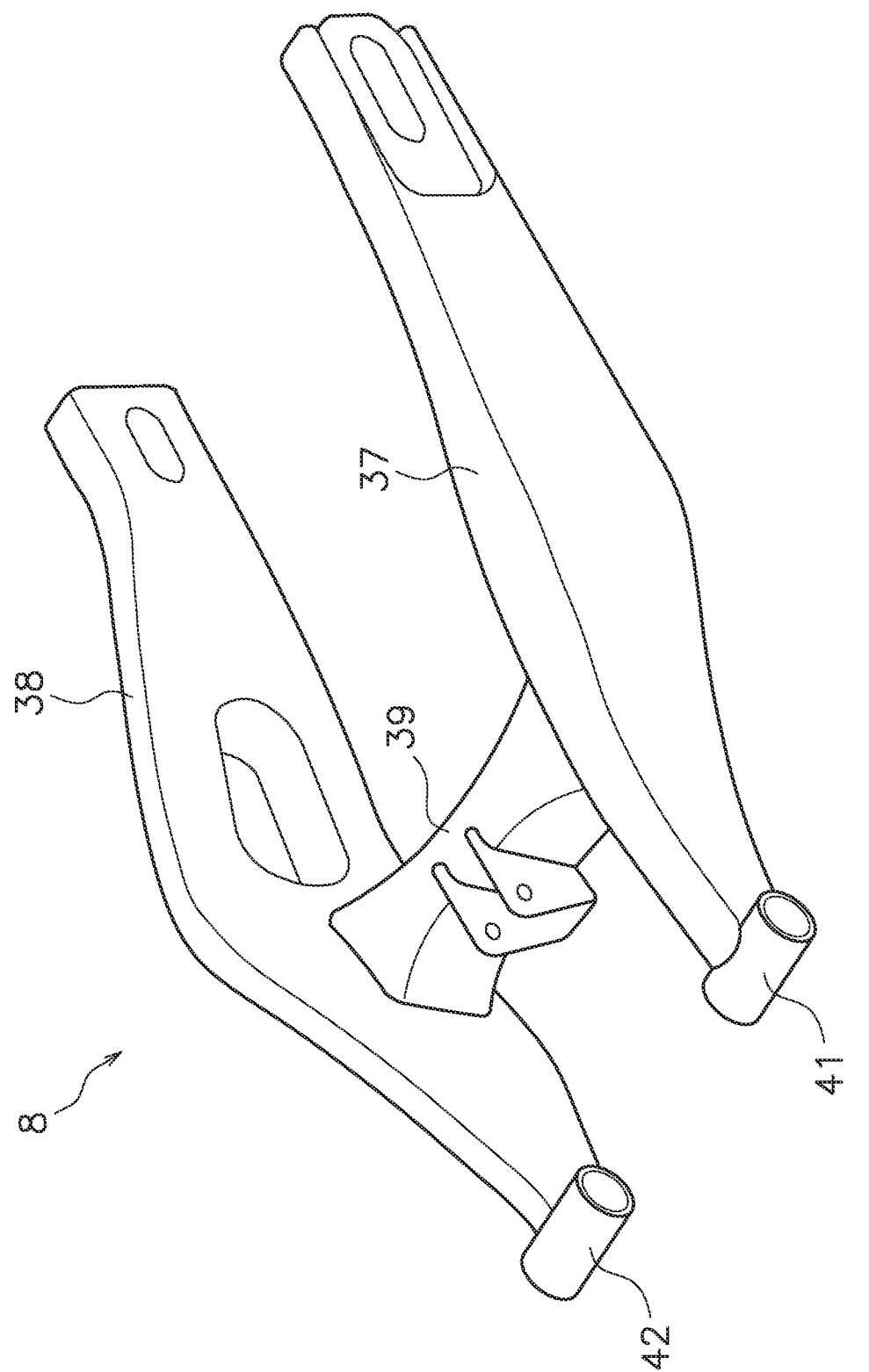
FIG. 7 is a perspective view of a rear arm.

FIG. 5 is a left side view of the vehicle body frame 10 and a configuration of a rear portion of the straddled vehicle 1. FIG. 6 is a right side view of the vehicle body frame 10 and the configuration of the rear portion of the straddled vehicle 1. FIG. 7 is a perspective view of the rear arm 8. As shown in FIGS. 5 to 7, the rear arm 8 includes a first rear arm 37, a second rear arm 38, and an arm coupling portion 39. The first and second rear arms 37 and 38 are disposed away from each other in the right-and-left direction. The first and second rear arms 37 and 38 support the rear wheel 7 such that the rear wheel 7 is made rotatable. The first rear arm 37 is disposed on the left of the rear wheel 7. The second rear arm 38 is disposed on the right of the rear wheel 7. The arm coupling portion 39 is disposed between the first and second rear arms 37 and 38. The arm coupling portion 39 couples the first and second rear arms 37 and 38 to each other therethrough. The first rear arm 37 includes a first shaft portion 41 located on the front end thereof. The second rear arm 38 includes a second shaft portion 42 located on the front end thereof. The rear arm 8 is supported at the first and second shaft portions 41 and 42 by the pivot shaft 30 so as to be swingable.

FIGS. 3 and 4 show the first and second shaft portions 41 and 42 supported by the pivot shaft 30. As shown in FIG. 3, the first plate portion 31 of the pivot support frame 29 is located on a more inner side than the first shaft portion 41 in the right-and-left direction. The second plate portion 32 of the pivot support frame 29 is located on a more inner side than the second shaft portion 42 in the right-and-left direction. Therefore, the distance between the first and second plate portions 31 and 32 is smaller than that between the first and second shaft portions 41 and 42 in the right-and-left direction.

As shown in FIG. 4, the first connecting portion 25 is located at least in portion on a more inner side than the first shaft portion 41 in the right-and-left direction. In other words, the first rear frame 18 is connected to the main frame 17 on a more inner side than the first shaft portion 41 in the right-and-left direction. The second connecting portion 28 is located at least in portion on a more inner side than the second shaft portion 42 in the right-and-left direction. In other words, the second rear frame 19 is connected to the main frame 17 on a more inner side than the second shaft portion 42 in the right-and-left direction.

Figure 8:
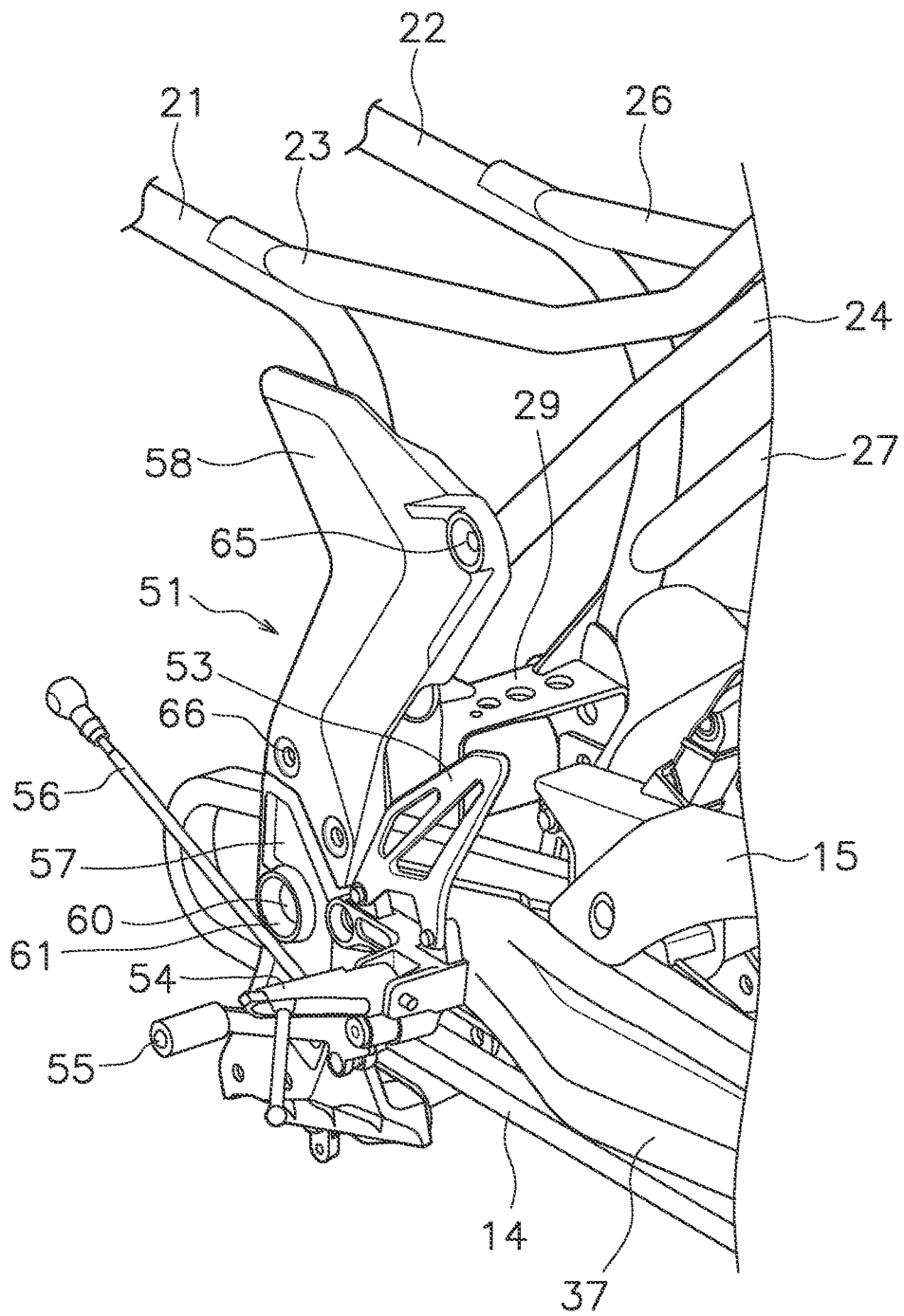
FIG. 8 is a perspective view of the configuration of the rear portion of the straddled vehicle.
Figure 9:
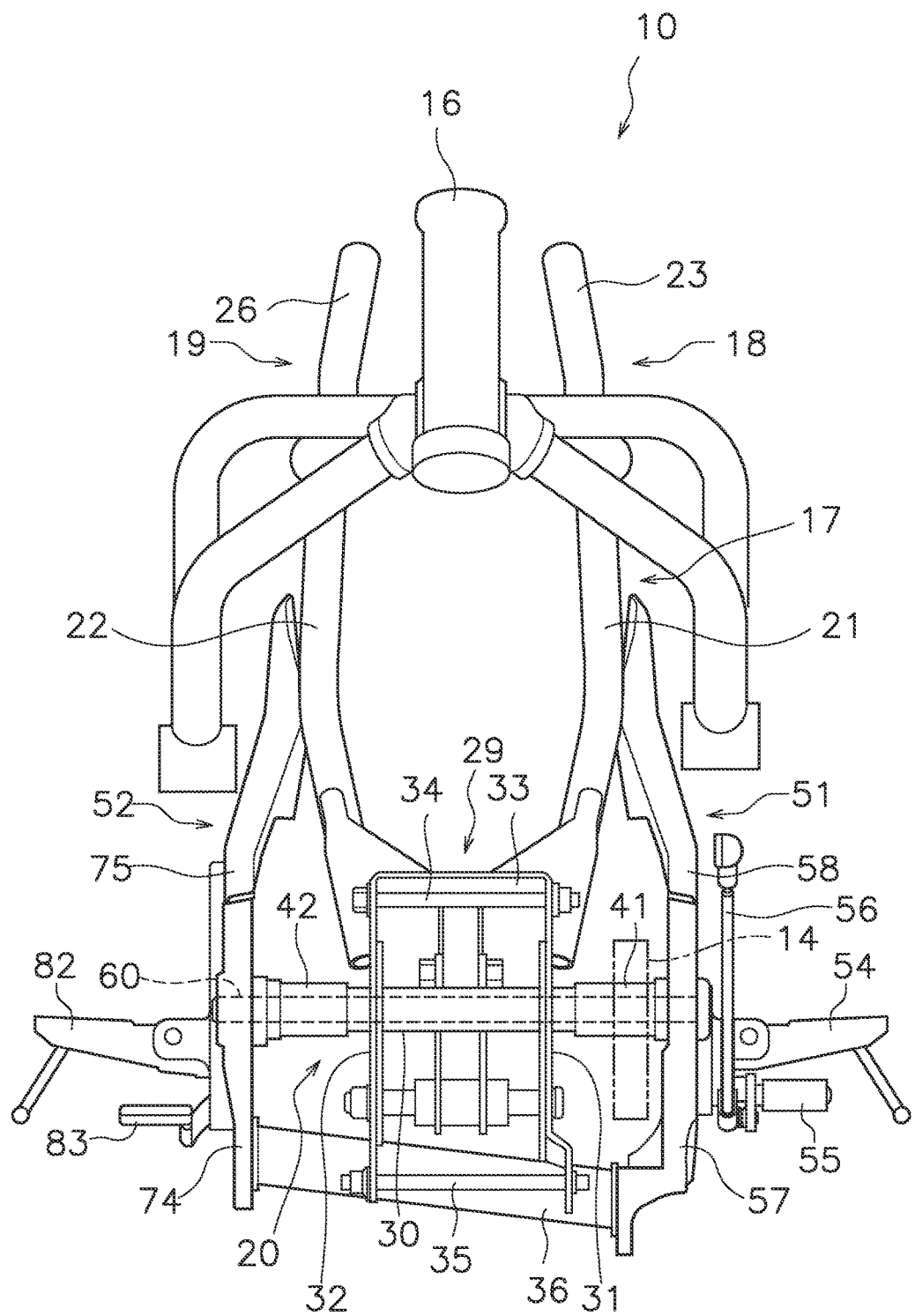
FIG. 9 is a front view of the vehicle body frame, a first reinforcing component, and a second reinforcing component.

As shown in FIG. 5, the straddled vehicle 1 includes a first reinforcing component 51. As shown in FIG. 6, the straddled vehicle 1 includes a second reinforcing component 52. The first and second reinforcing components 51 and 52 are each made of metal such as aluminum. FIG. 8 is a perspective view of the rear portion of the straddled vehicle 1. FIG. 9 is a front view of the vehicle body frame 10, the first reinforcing component 51, and the second reinforcing component 52.

Figure 10:
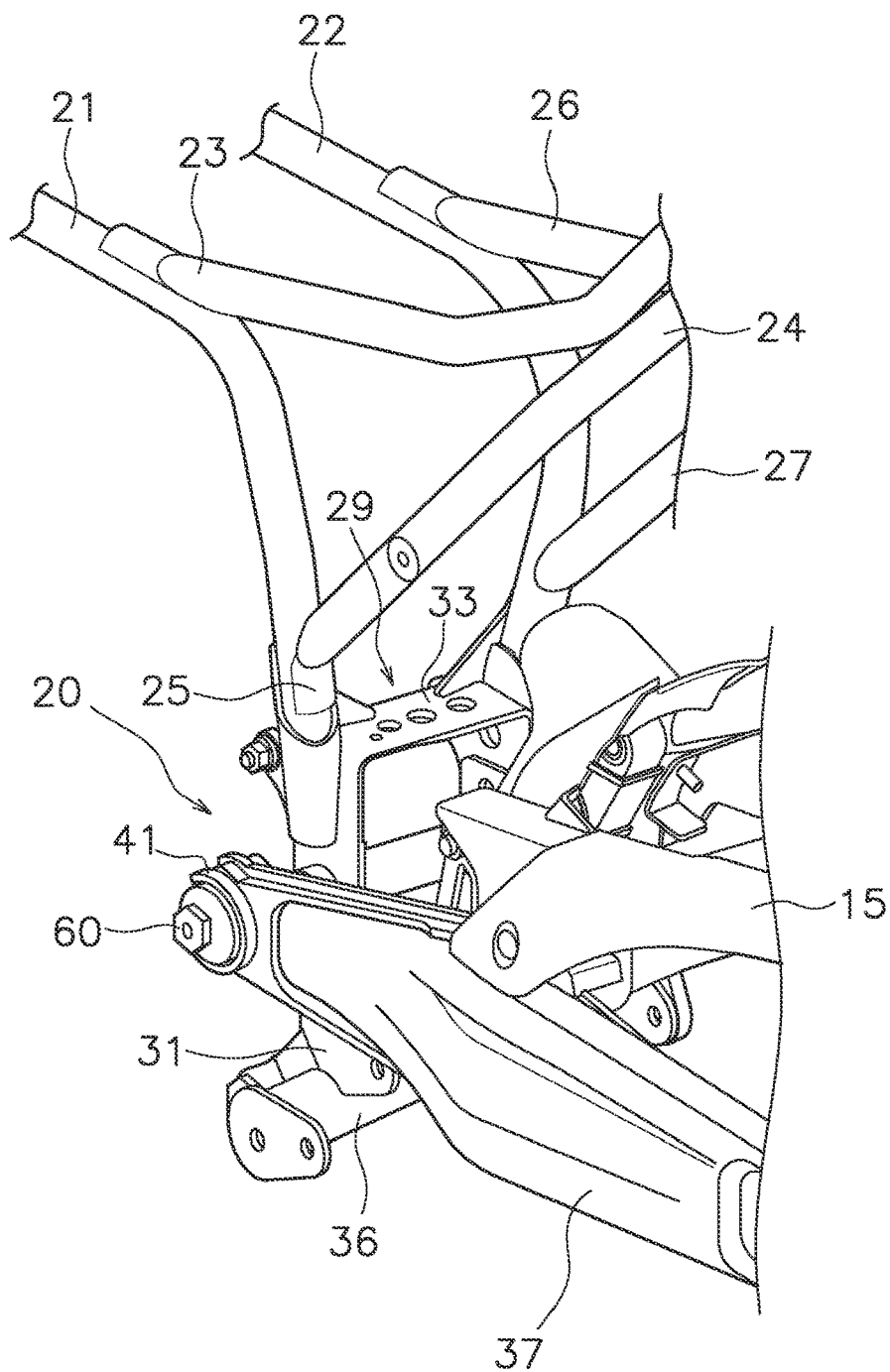
FIG. 10 is a perspective view of the configuration of the rear portion of the straddled vehicle from which the first reinforcing component is detached.

The first reinforcing component 51 is provided as a discrete component separated from the first rear frame 18 and the pivot support portion 20. The first reinforcing component 51 is attached to the first rear frame 18 and the pivot support portion 20 in detachable manner. FIG. 10 is a perspective view of the rear portion of the straddled vehicle 1, from which the first reinforcing component 51 is detached.

The first reinforcing component 51 is disposed outside the first main frame 21 in the right-and-left direction. The first reinforcing component 51 overlaps the first main frame 21 in a vehicle side view. The first reinforcing component 51 is disposed outside the first rear frame 18 in the right-and-left direction. The first reinforcing component 51 overlaps the first rear frame 18 in the vehicle side view. The first reinforcing component 51 is disposed outside the first rear arm 37 in the right-and-left direction. The first reinforcing component 51 overlaps the first rear arm 37 in the vehicle side view. The first reinforcing component 51 is disposed outside the pivot support portion 20 in the right-and-left direction. The first reinforcing component 51 overlaps the pivot support portion 20 in the vehicle side view.

The first reinforcing component 51 is disposed outside the chain 14 in the right-and-left direction. The first reinforcing component 51 overlaps the chain 14 in the vehicle side view. In FIG. 9, the position of the chain 14 is depicted with dashed two-dotted line. As shown in FIG. 9, the chain 14 is disposed between the pivot support frame 29 and the first reinforcing component 51 in the right-and-left direction. In other words, the pivot support frame 29 is disposed inside the chain 14 in the right-and-left direction. When described in detail, the first plate portion 31 is disposed inside the chain 14 in the right-and-left direction.

As shown in FIG. 5, the straddled vehicle 1 includes a first stay 53, a first footrest 54, and a shift pedal 55. The first stay 53 is attached to the first reinforcing component 51. The first footrest 54 and the shift pedal 55 are attached to the first stay 53. The first footrest 54 and the shift pedal 55 protrude outward from the first stay 53 in the right-and-left direction. A shift rod 56 is connected to the shift pedal 55. The shift rod 56 is connected to the power unit 6. As shown in FIG. 9, in a vehicle front view, the first footrest 54, the shift pedal 55, and the shift rod 56 are disposed outside the first reinforcing component 51 in the right-and-left direction.

The first reinforcing component 51 includes a first lower reinforcing member 57 and a first upper reinforcing member 58. The first lower reinforcing member 57 and the first upper reinforcing member 58 are provided as discrete members separated from each other. The first lower reinforcing member 57 is connected to the pivot support portion 20 in detachable manner. The first lower reinforcing member 57 is connected to the cross member 36 in detachable manner. The first upper reinforcing member 58 is disposed above the first lower reinforcing member 57. The first upper reinforcing member 58 is connected to the first rear frame 18 in detachable manner. The first upper reinforcing member 58 is attached to the first lower reinforcing member 57 in detachable manner.

Figure 11:
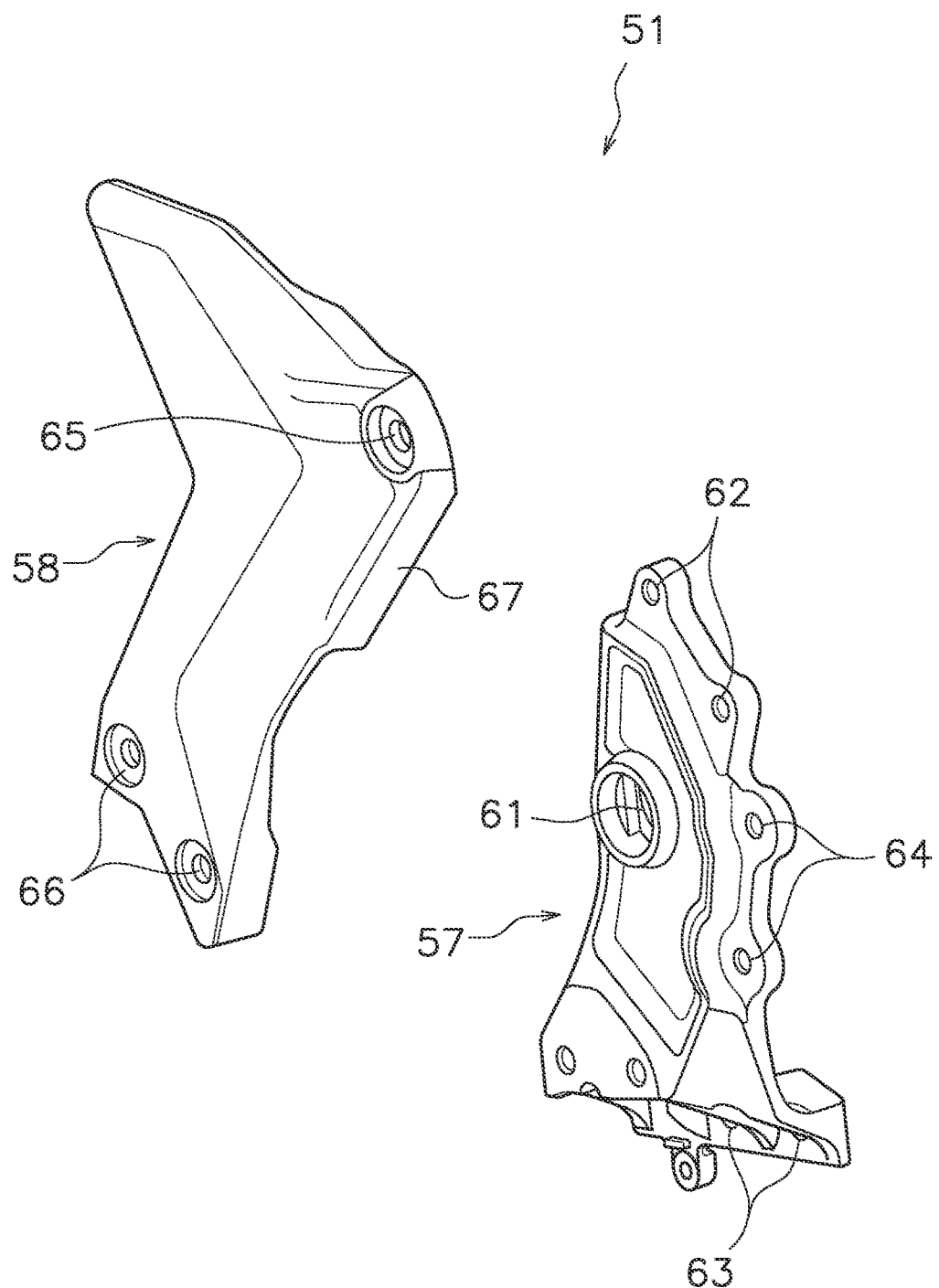
FIG. 11 is an exploded perspective view of the first reinforcing component.
Figure 12:
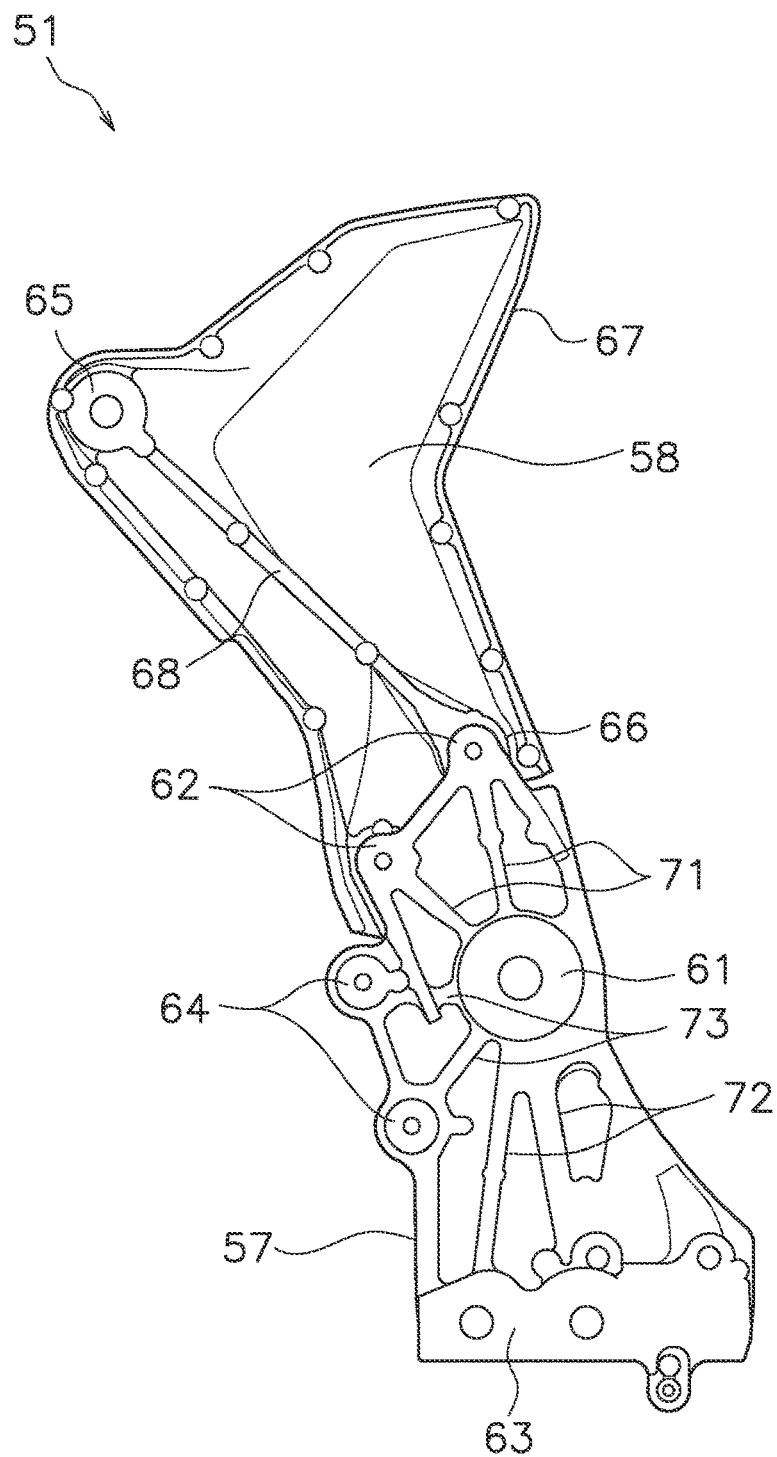
FIG. 12 is a diagram showing the inner surface of the first reinforcing component.

FIG. 11 is an exploded perspective view of the first lower reinforcing member 57 and the first upper reinforcing member 58. FIG. 12 is a diagram showing the inner surface of the first reinforcing component 51. As shown in FIG. 11, the first lower reinforcing member 57 includes a first lower fixed portion 61. The first lower fixed portion 61 is fixed to the pivot support portion 20. As shown in FIG. 3, the straddled vehicle 1 includes a bolt 60. The bolt 60 fixes the pivot shaft 30 to the pivot support portion 20. The first lower fixed portion 61 includes a hole penetrated by the bolt 60. The first lower reinforcing member 57 is fixed to the pivot shaft 30 by the bolt 60. The first lower reinforcing member 57 is fixed together with the pivot shaft 30 to the pivot support frame 29 by the bolt 60.

The first lower reinforcing member 57 includes second lower fixed portions 62. The second lower fixed portions 62 are fixed to the first upper reinforcing member 58. Each second lower fixed portion 62 includes a hole penetrated by a bolt. Each second lower fixed portion 62 is fixed to the first upper reinforcing member 58 by the bolt. The first lower reinforcing member 57 includes third lower fixed portions 63. The third lower fixed portions 63 are fixed to the cross member 36. Each third lower fixed portion 63 includes a hole penetrated by a bolt. Each third lower fixed portion 63 is fixed to the cross member 36 by the bolt. The first lower reinforcing member 57 includes fourth lower fixed portions 64. Each fourth lower fixed portion 64 is a portion to which the first stay 53 is fixed. Each fourth lower fixed portion 64 includes a hole penetrated by a bolt. Each fourth lower fixed portion 64 is a portion to which the first stay 53 is fixed by the bolt.

The first upper reinforcing member 58 includes a first upper fixed portion 65. The first upper fixed portion 65 is fixed to the first rear frame 18. The first upper fixed portion 65 includes a hole penetrated by a bolt. The first upper fixed portion 65 is fixed to the first lower frame 24 by the bolt. The first upper reinforcing member 58 includes second upper fixed portions 66. The second upper fixed portions 66 are fixed to the first lower reinforcing member 57. Each second upper fixed portion 66 includes a hole penetrated by a bolt. Each second upper fixed portion 66 is fixed to each second lower fixed portion 62 of the first lower reinforcing member 57 by the bolt.

The first upper reinforcing member 58 is shaped to bulge outward in the vehicle right-and-left direction. The first upper reinforcing member 58 includes an edge portion 67. The first upper reinforcing member 58 is shaped to bend on the edge portion 67. The edge portion 67 protrudes from the inner surface of the first upper reinforcing member 58. The first upper reinforcing member 58 is provided with a reinforcing rib 68 on the inner surface thereof. The reinforcing rib 68 extends from the first upper fixed portion 65 to the second upper fixed portion 66.

The first lower reinforcing member 57 includes first reinforcing ribs 71, second reinforcing ribs 72, and third reinforcing ribs 73. The first, second, and third reinforcing ribs 71, 72, and 73 radially extend from the first lower fixed portion 61. The first reinforcing ribs 71 extend from the first lower fixed portion 61 to the second lower fixed portions 62. The second reinforcing ribs 72 extend from the first lower fixed portion 61 to the third lower fixed portions 63. The third reinforcing ribs 73 extend from the first lower fixed portion 61 to the fourth lower fixed portions 64.

The second reinforcing component 52 has a similar structure to the first reinforcing component 51. The second reinforcing component 52 is provided as a discrete component separated from the second rear frame 19 and the pivot support portion 20. The second reinforcing component 52 is attached to the second rear frame 19 and the pivot support portion 20 in detachable manner.

The second reinforcing component 52 is disposed outside the second main frame 22 in the right-and-left direction. The second reinforcing component 52 overlaps the second main frame 22 in the vehicle side view. The second reinforcing component 52 is disposed outside the second rear frame 19 in the right-and-left direction. The second reinforcing component 52 overlaps the second rear frame 19 in the vehicle side view. The second reinforcing component 52 is disposed outside the second rear arm 38 in the right-and-left direction. The second reinforcing component 52 overlaps the second rear arm 38 in the vehicle side view. The second reinforcing component 52 is disposed outside the pivot support portion 20 in the right-and-left direction. The second reinforcing component 52 overlaps the pivot support portion 20 in the vehicle side view.

In the right-and-left direction, the distance between the first and second reinforcing components 51 and 52 is greater than the width of the pivot support frame 29. In the right-and-left direction, the distance between the first and second reinforcing components 51 and 52 is greater than that between the first shaft portion 41 of the first rear arm 37 and the second shaft portion 42 of the second rear arm 38. In the right-and-left direction, the distance between the first and second reinforcing components 51 and 52 is greater than that between the first and second rear frames 18 and 19. In the right-and-left direction, the distance between the first and second reinforcing components 51 and 52 is greater than that between the first and second main frames 21 and 22.

The second reinforcing component 52 includes a second lower reinforcing member 74 and a second upper reinforcing member 75. The second lower reinforcing member 74 and the second upper reinforcing member 75 are provided as discrete members separated from each other. The second lower reinforcing member 74 is connected to the pivot support portion 20 in detachable manner. The second lower reinforcing member 74 is connected to the cross member 36 in detachable manner. Therefore, the first and second reinforcing components 51 and 52 are connected to each other by the cross member 36. Besides, the first and second reinforcing components 51 and 52 are connected to each other by the pivot shaft 30. The first and second reinforcing components 51 and 52 are connected to the pivot shaft 30 by the bolt 60.

The second upper reinforcing member 75 is disposed above the second lower reinforcing member 74. The second upper reinforcing member 75 is connected to the second rear frame 19 in detachable manner. The second upper reinforcing member 75 is attached to the second lower reinforcing member 74 in detachable manner. The second lower reinforcing member 74 has a similar structure to the first lower reinforcing member 57. The second upper reinforcing member 75 has a similar structure to the first upper reinforcing member 58.

As shown in FIG. 6, the straddled vehicle 1 includes a rear brake 76 and a brake hose 77. The rear brake 76 brakes the rear wheel 7. The rear brake 76 is disposed to face the sprocket 13. The brake hose 77 is connected to the rear brake 76. The brake hose 77 is disposed along the second rear arm 38. The brake hose 77 extends to a more front side than the second rear frame 19. The brake hose 77 is connected to a hydraulic control unit (not shown in the drawings). The brake hose 77 passes through the inner side of the second reinforcing component 52 in the vehicle right-and-left direction. The brake hose 77 passes through the inner side of the second upper reinforcing member 75 in the vehicle right-and-left direction. The brake hose 77 overlaps the second upper reinforcing member 75 in the vehicle side view.

The straddled vehicle 1 includes a second stay 81, a second footrest 82, and a brake pedal 83. The second stay 81 is attached to the second reinforcing component 52. The second footrest 82 and the brake pedal 83 are attached to the second stay 81. The second footrest 82 and the brake pedal 83 protrude outward from the second stay 81 in the right-and-left direction. A master cylinder 84 of the rear brake 76 is connected to the brake pedal 83. The master cylinder 84 is connected to the hydraulic control unit described above through a connecting hose (not shown in the drawings). As shown in FIG. 9, in the vehicle front view, the second footrest 82 and the brake pedal 83 are disposed outside the second reinforcing component 52 in the right-and-left direction.

In the straddled vehicle 1 according to the present embodiment explained above, the first reinforcing component 51 passes through the outer side of the first rear arm 37 and is connected to the pivot support portion 20 and the first rear frame 18. Likewise, the second reinforcing component 52 passes through the outer side of the second rear arm 38 and is connected to the pivot support portion 20 and the second rear frame 19. Accordingly, the vehicle body frame 10 is enhanced in stiffness. Besides, by omitting installation of the first and second reinforcing components 51 and 52 in a manufacturing process, the vehicle body frame 10 is made compatible as well to a straddled vehicle model not requiring large stiffness. Accordingly, the same type of frame is made easily compatible among a plurality of straddled vehicle models.

One embodiment of the present invention has been explained above. However, the present invention is not limited to the embodiment described above, and a variety of changes can be made without departing from the gist of the present invention.

The straddled vehicle 1 may be a motorcycle of so-called a naked type without fairings. The straddled vehicle 1 may be a motorcycle of a street type, an off-road type, or an adventure type.

The structure of the vehicle body frame 10 is not limited to that in the embodiment described above and may be changed. For example, the main frame 17 may be changed in shape. The rear frames 18 and 19 may be changed in shape. The pivot support portion 20 may be changed in shape.

The structure of the first reinforcing component 51 is not limited to that in the embodiment described above and may be changed. For example, the first upper reinforcing member 58 and the first lower reinforcing member 57 may be integrated with each other as an integrated member. The first reinforcing component 51 may be connected to the pivot support frame 29 without through the pivot shaft 30. The structure of the second reinforcing component 52 is not limited to that in the embodiment described above and may be changed. For example, the second upper reinforcing member 75 and the second lower reinforcing member 74 may be integrated with each other as an integrated member. The second reinforcing component 52 may be connected to the pivot support frame 29 without through the pivot shaft 30. The material, of which the first and second reinforcing components 51 and 52 are made, is not limited to metal and may be any other suitable material such as resin.

REFERENCE SIGNS LIST

7: Rear wheel, 10: Vehicle body frame, 13: Sprocket, 14: Chain, 16: Head pipe, 17: Main frame, 18: First rear frame, 19: Second rear frame, 20: Pivot support portion, 29: Pivot support frame, 30: Pivot shaft, 36: Cross member, 37: First rear arm, 38: Second rear arm, 51: First reinforcing component, 52: Second reinforcing component, 57: First lower reinforcing member, 58: First upper reinforcing member, 60: Bolt, 68: Reinforcing rib, 74: Second lower reinforcing member, 75: Second upper reinforcing member, 76: Rear brake, 77: Brake hose

What is claimed is:
1. A straddled vehicle comprising:
a rear wheel;
a first rear arm rotatably supporting the rear wheel;
a vehicle body frame, including:
  a head pipe,
  a main frame connected to the head pipe,
  a pivot support portion connected to the main frame, the pivot support portion including
    a pivot shaft swingably supporting the first rear arm, and
    a pivot support frame supporting the pivot shaft, and
  a first rear frame extending rearward from the main frame, the first rear frame being connected to the main frame on a more inner side than the first rear arm in a right-and-left direction of the straddled vehicle; and a first reinforcing component that is separable from each of the first rear arm, the first rear frame, and the main frame, wherein
the first reinforcing component is disposed outside the first rear arm and the main frame in the right-and-left direction, and is detachably directly connected to each of the pivot support portion and the first rear frame, to thereby rigidly connect the main frame to the pivot support portion, such that the main frame is connected to the pivot support portion both directly and via the first reinforcing component, to therefore have enhanced stiffness.

2. The straddled vehicle according to claim 1, wherein the first reinforcing component partially overlaps the first rear arm in a side view of the straddled vehicle.

3. The straddled vehicle according to claim 1, wherein the rear wheel includes a sprocket,
the straddled vehicle further comprises a chain wound about the sprocket, and
the first reinforcing component is disposed outside the chain in the right-and-left direction of the straddled vehicle.

4. The straddled vehicle according to claim 1, wherein the first reinforcing component partially overlaps the pivot support portion and the first rear frame in a side view of the straddled vehicle.

5. The straddled vehicle according to claim 1, wherein the first reinforcing component includes
a first lower reinforcing member connected to the pivot support portion, and
a first upper reinforcing member that is separated from the first lower reinforcing member, and is connected to the first rear frame.

6. The straddled vehicle according to claim 5, wherein the first upper reinforcing member is detachably attached to the first lower reinforcing member, and is detachably attached to the first rear frame.

7. The straddled vehicle according to claim 5, further comprising:
a bolt that fixes the first lower reinforcing member and the pivot shaft together to the pivot support frame.

8. The straddled vehicle according to claim 5, wherein the first upper reinforcing member is shaped to bulge outward in the right-and-left direction of the straddled vehicle.

9. The straddled vehicle according to claim 5, wherein the first upper reinforcing member includes a reinforcing rib provided on an inner surface of the first upper reinforcing member.

10. The straddled vehicle according to claim 1, further comprising:
a second rear arm disposed away from the first rear arm in the right-and-left direction of the straddled vehicle, the second rear arm rotatably supporting the rear wheel; and
a second reinforcing component, wherein
the vehicle body frame further includes a second rear frame extending rearward from the main frame, the second rear frame being disposed away from the first rear frame, and being connected to the main frame on a more inner side than the second rear arm, in the right-and-left direction of the straddled vehicle, and
the second reinforcing component is separated from the second rear frame, is disposed outside the second rear arm in the right-and-left direction of the straddled vehicle, and is connected to the pivot support portion and the second rear frame.

11. The straddled vehicle according to claim 10, further comprising:
a cross member connected to the first reinforcing component and the second reinforcing component.

12. The straddled vehicle according to claim 10, wherein the cross member is connected to the pivot support frame.

13. The straddled vehicle according to claim 10, wherein the second reinforcing component includes:
a second lower reinforcing member connected to the pivot support portion, and
a second upper reinforcing member that is separated from the second lower reinforcing member, and is connected to the second rear frame.

14. The straddled vehicle according to claim 13, wherein the second upper reinforcing member is detachably connected to the second lower reinforcing member, and is detachably connected to the second rear frame.

15. The straddled vehicle according to claim 13, further comprising:
a rear brake configured to brake the rear wheel; and
a brake hose connected to the rear brake, the brake hose being disposed along the second rear arm, wherein
the brake hose is disposed inside the second upper reinforcing member in the right-and-left direction of the straddled vehicle.

* * * * *